United States Patent
Zhang et al.

(10) Patent No.: US 9,736,738 B2
(45) Date of Patent: Aug. 15, 2017

(54) METHOD FOR TRANSFERRING CONTEXT AND MOBILITY MANAGEMENT ENTITY

(71) Applicant: HUAWEI TECHNOLOGIES CO., LTD., Shenzhen (CN)

(72) Inventors: Dongmei Zhang, Beijing (CN); Lijia Zhang, Beijing (CN); Ke Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 14/197,660

(22) Filed: Mar. 5, 2014

(65) Prior Publication Data
US 2014/0185585 A1  Jul. 3, 2014

Related U.S. Application Data

(63) Continuation of application No. PCT/CN2012/081188, filed on Sep. 10, 2012.

(30) Foreign Application Priority Data

Sep. 8, 2011 (CN) .......................... 2011 1 0268480

(51) Int. Cl.
*H04W 36/00* (2009.01)
*H04W 36/12* (2009.01)

(52) U.S. Cl.
CPC .... *H04W 36/0033* (2013.01); *H04W 36/0038* (2013.01); *H04W 36/12* (2013.01)

(58) Field of Classification Search
None
See application file for complete search history.

(56) References Cited

U.S. PATENT DOCUMENTS

2010/0329208 A1* 12/2010 Hayashi ................ H04L 63/126
 370/331
2011/0122845 A1* 5/2011 Meirosu ............ H04W 36/0055
 370/332

(Continued)

FOREIGN PATENT DOCUMENTS

CN  102026313  4/2011
CN  102098723  6/2011

(Continued)

OTHER PUBLICATIONS

International Search Report mailed Dec. 20, 2012 in corresponding International Patent Application No. PCT/CN2012/081188.

(Continued)

*Primary Examiner* — Hassan Phillips
*Assistant Examiner* — Saba • Tsegaye
(74) *Attorney, Agent, or Firm* — Staas & Halsey LLP

(57) ABSTRACT

The present invention discloses a method for transferring a context and a mobility management entity. When S1 handover occurs on an RN, the method includes: acquiring, by a source MME to which a UE is attached, an indicator for transferring a context of the UE, where the UE is a UE served by the RN when the S1 handover occurs; and transferring, by the source MME to which the UE is attached, the context of the UE to a target MME according to the indicator for transferring the context of the UE, so that the target MME acquires security information of the UE according to the context of the UE, where the target MME is an MME to which the UE needs to be attached in the handover process.

15 Claims, 5 Drawing Sheets

A source MME to which a UE is attached acquires an indicator for transferring a context of the UE, where the UE is a UE served by an RN when S1 handover occurs — 101

The source MME to which the UE is attached transfers the context of the UE to a target MME according to the indicator for transferring the context of the UE, so that the target MME acquires security information of the UE according to the context of the UE, where the target MME is an MME to which the UE needs to be attached in the handover process — 102

(56) References Cited

U.S. PATENT DOCUMENTS

| | | | | |
|---|---|---|---|---|
| 2012/0039299 A1* | 2/2012 | Teyeb | .................. | H04B 7/2606 370/331 |
| 2012/0071085 A1* | 3/2012 | Gunnarsson | .......... | H04W 24/00 455/7 |
| 2012/0263096 A1* | 10/2012 | Masini | .................. | H04W 36/10 370/315 |
| 2013/0150047 A1 | 6/2013 | Zhang et al. | | |
| 2013/0183971 A1* | 7/2013 | Tamaki | ............. | H04W 36/0061 455/436 |
| 2013/0322325 A1* | 12/2013 | Hahn | ................ | H04W 36/0055 370/315 |
| 2013/0329629 A1 | 12/2013 | Bao et al. | | |
| 2014/0051442 A1 | 2/2014 | Yang et al. | | |

FOREIGN PATENT DOCUMENTS

| | | |
|---|---|---|
| CN | 102118808 | 7/2011 |
| EP | 2296403 | 3/2011 |

OTHER PUBLICATIONS

PCT International Search Report and Written Opinion of the International Searching Authority dated Dec. 20, 2012 in corresponding International Patent Application No. PCT/CN2012/081188.

"$3^{rd}$ Generation Partnership Project; Technical Specification Group Core Network and Terminals; Information element mapping between Mobile Station—Base Station System (MS-BSS) and Base Station System—Mobile-services Switching Centre (BSS-MSC); Signaling procedures and the Mobile Application Part (MAP) (Release 11)", 3GPP TS 29.010 V11.1.0, Mar. 2014, 145 pages.

* cited by examiner

US 9,736,738 B2

METHOD FOR TRANSFERRING CONTEXT AND MOBILITY MANAGEMENT ENTITY

CROSS-REFERENCE TO RELATED APPLICATION

This application is a continuation of International Application No. PCT/CN2012/081188, filed on Sep. 10, 2012, which claims priority to Chinese Patent Application No. 201110268480.6, filed on Sep. 8, 2011, both of which are hereby incorporated by reference in their entireties.

TECHNICAL FIELD

The present invention relates to the communications field, and in particular, to a method for transferring a context and a mobility management entity.

BACKGROUND

To meet a high-rate transmission requirement for next-generation mobile communications, LTE-A (Long Term Evolution-Advanced, Long Term Evolution-Advanced) has introduced a wireless relay technology. As a newly-introduced network node in LTE-A, an RN (Relay Node, relay node) functions as both a UE (User Equipment, user equipment) and an eNB (evolved NodeB, evolved base station). On one hand, the same as a conventional UE, the RN connects, through a DeNB (Donor eNB, Donor eNB) that provides an access service for the RN, to an MME (Mobility Management Entity, mobility management entity). On the other hand, after the RN changes to an eNB, UEs within the coverage of the RN connect to the MME through the DeNB. Therefore, when inter-MME handover occurs on the RN, that is, when S1 handover occurs, the UEs change their MMEs along with the RN, or may be attached to respective MMEs with the RN, in which case some UEs need to change their MMEs and some UEs do not need to change their MMEs. In a scenario where the S1 handover occurs on the RN, context transfer is needed to maintain continuity of a device connection.

When the S1 handover occurs on the RN, a source MME to which the RN is attached transfers a context of the RN to a target MME to which the RN will be attached, thereby ensuring continuity of an RN connection before and after the S1 handover occurs. The context of the RN at least includes information of the RN, such as security information, KASME, and KSI.

When the S1 handover occurs on the RN, the UEs within the coverage of the RN cannot be aware of the handover process. When a source MME to which a UE is attached changes, the source MME does not process a context of the UE. As a result, security information of the UE is lost in the process of the S1 handover that occurs on the RN, and therefore a target MME to which the UE will be attached cannot acquire the security information of the UE. Then security protection cannot be implemented for an NAS (Non-Access Stratum, non-access stratum) message between the UE and the target MME of the UE.

SUMMARY

An objective of the present invention is to implement transfer of a context of a UE in a scenario where S1 handover occurs on an RN, so as to implement security protection for an NAS message between the UE and a target MME of the UE. The technical solutions are as follows:

According to one aspect, a method for transferring a context is provided, where when S1 handover occurs on a relay node RN, the method includes:

acquiring, by a source mobility management entity MME to which a user equipment UE is attached, an indicator for transferring a context of the UE, where the UE is a UE served by the RN when the S1 handover occurs; and transferring, by the source MME to which the UE is attached, the context of the UE to a target MME according to the indicator for transferring the context of the UE, so that the target MME acquires security information of the UE according to the context of the UE, where the target MME is an MME to which the UE needs to be attached in the handover process.

According to another aspect, a mobility management entity is provided, where the mobility management entity MME includes:

an indicator acquiring module, configured to acquire an indicator for transferring a context of a user equipment UE, where the UE is a UE served by a relay node RN when S1 handover occurs on the RN; and a transferring module, configured to transfer, according to the indicator for transferring the context of the UE that is acquired by the indicator acquiring module, the context of the UE to a target MME, so that the target MME acquires security information of the UE according to the context of the UE, where the target MME is an MME to which the UE needs to be attached in the handover process.

According to still another aspect, a method for transferring a context is further provided, where when S1 handover occurs on a relay node RN, the method includes:

receiving, by a target mobility management entity MME to which a user equipment UE is attached, a context of the UE that is sent by a source MME to which the UE was attached, where the context of the UE is sent, by the source MME to which the UE was attached, in the handover process according to an acquired indicator for transferring the context of the UE, and the UE is a UE served by the RN when the S1 handover occurs; and acquiring, by the target MME to which the UE is attached, security information of the UE according to the received context of the UE.

According another aspect, a mobility management entity is further provided, where the mobility management entity MME includes:

a transceiving module, configured to receive a context of a user equipment UE that is sent by a source MME to which the UE is attached, where the context of the UE is sent, by the source MME to which the UE is attached, in a process of S1 handover that occurs on a relay node RN, and according to an acquired indicator for transferring the context of the UE, and the UE is a UE served by an RN when S1 handover occurs; and an acquiring module, configured to acquire security information of the UE according to the context of the UE, where the context of the UE is received by the transceiving module.

A source MME to which a UE is attached transfers a context of the UE to a target MME, so that the context of the UE can be transferred when S1 handover occurs on an RN, where the target MME is an MME to which the UE needs to be attached in the handover process. In this way, the target MME to which the UE needs to be attached can acquire security information of the UE, thereby ensuring continuity of communication between the UE and the target MME of the UE, and implementing security protection for an NAS message between the UE and the target MME of the UE.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

Figure 1:
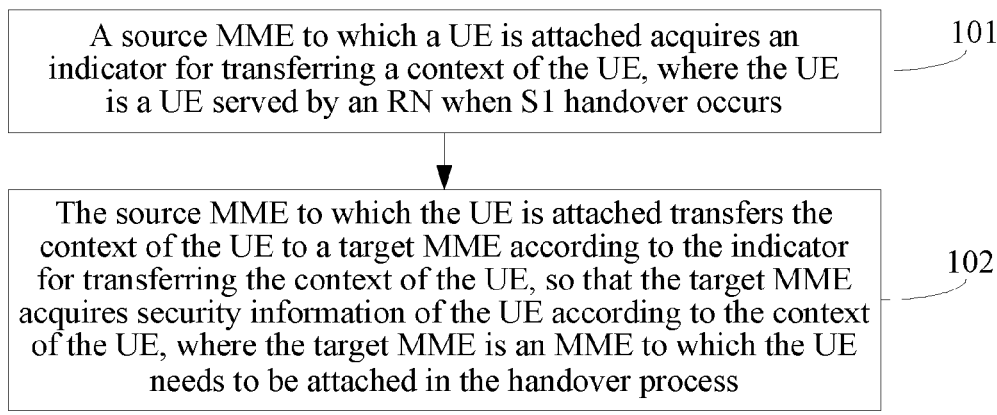
FIG. 1 is a flowchart of a method for transferring a context according to an embodiment of the present invention.

A method for transferring a context is provided in an embodiment of the present invention. Referring to FIG. 1, when S1 handover occurs on an RN, a process of the method is specifically as follows:

101: A source MME to which a UE is attached acquires an indicator for transferring a context of the UE, where the UE is a UE served by the RN when the S1 handover occurs.

102: The source MME to which the UE is attached transfers the context of the UE to a target MME according to the indicator for transferring the context of the UE, so that the target MME acquires security information of the UE according to the context of the UE, where the target MME is an MME to which the UE needs to be attached in the handover process.

When the source MME to which the UE is attached is the same as a source MME to which the RN is attached, before the source MME to which the UE is attached acquires the indicator for transferring the context of the UE, the method further includes:

determining that the UE is served by the RN; and the acquiring, by the source MME to which the UE is attached, the indicator for transferring the context of the UE includes:

acquiring, by the source MME to which the UE is attached, the indicator for transferring the context of the UE served by the RN.

The determining, by the source MME to which the UE is attached, that the UE is served by the RN includes:

when the UE accesses a network, receiving, by the source MME to which the UE is attached, an attach request message that is sent by the UE and carries an RN indicator; and determining, according to the RN indicator carried in the attach request message, that the UE is served by the RN, where the RN indicator is an RN cell identifier, an RN eNB identifier, or an identifier indicating an RN node type;

or when the UE accesses a network, receiving, by the source MME to which the UE is attached, an S1 initial UE message that is sent by the RN or sent by a DeNB and carries an RN indicator; and determining, according to the RN indicator carried in the S1 initial UE message, that the UE is served by the RN, where the RN indicator is an RN cell identifier, an RN eNB identifier, or an identifier indicating an RN node type;

or when the RN performs the S1 handover, receiving, by the source MME to which the UE is attached, an identifier list of UEs served by the RN, where the identifier list is sent by a DeNB; and determining, according to the identifier list of the UEs, that the UE is served by the RN;

or when the UE is handed over to the RN through S1, receiving, by the source MME to which the UE is attached, a relocation request message sent by an MME to which the UE was attached before the UE is handed over to the RN through S1, where the relocation request message carries an indicator for handing over the UE to the RN; and determining, according to the indicator for handing over the UE to the RN that is carried in the relocation request message, that the UE is served by the RN;

or when the UE is handed over to the RN through X2, receiving, by the source MME to which the UE is attached, a path switch request message sent by the RN, where the path switch request message carries an indicator for handing over the UE to the RN; and determining, according to the indicator for handing over the UE to the RN that is carried in the path switch request message, that the UE is served by the RN.

The indicator for transferring the context of the UE includes a group mobility indicator or an indicator to get UE context.

When the source MME to which the UE is attached is different from the source MME to which the RN is attached and the indicator for transferring the context of the UE is specifically the group mobility indicator, the acquiring, by the source MME to which the UE is attached, the indicator for transferring the context of the UE includes:

receiving, by the source MME to which the UE is attached, the group mobility indicator sent by the source MME to which the RN is attached, where the group mobility indicator at least includes identifiers of UEs served by the RN; and using the group mobility indicator as the acquired indicator for transferring the context of the UE.

Optionally, when the source MME to which the UE is attached is different from the source MME to which the RN is attached and the indicator for transferring the context of the UE is specifically the indicator to get UE context, the acquiring, by the source MME to which the UE is attached, the indicator for transferring the context of the UE includes:

after the RN completes the S1 handover, receiving, by the source MME to which the UE is attached, the indicator to get UE context, where the indicator is sent by the target MME to which the UE is attached; and using the indicator to get UE context as the acquired indicator for transferring the context of the UE.

The indicator to get UE context is sent in the handover process after the target MME to which the UE is attached receives a TAU (Tracking Area Update, Tracking Area Update) request, where the TAU request is sent by the UE; or sent after receipt of a group mobility indicator, where the group mobility indicator is sent by a target MME to which the RN is attached, and the group mobility indicator at least includes identifiers of UEs served by the RN.

It should be noted that in this embodiment and the following embodiments, an identifier of a UE may specifically be an IMSI (International Mobile Subscriber Identity, international mobile subscriber identity) identity, a GUTI (Globally Unique Temporary Identity, globally unique temporary identity) identity, or the like of the UE, and this is not specifically limited in this embodiment.

Figure 2:
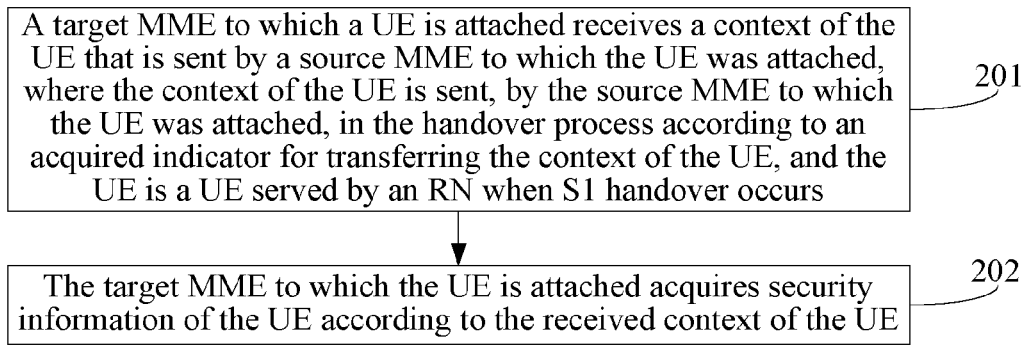
FIG. 2 is a flowchart of a method for transferring a context according to another embodiment of the present invention.

A method for transferring a context is provided in another embodiment of the present invention. Referring to FIG. 2, when S1 handover occurs on an RN, a process of the method is specifically as follows:

201: A target MME to which a UE is attached receives a context of the UE that is sent by a source MME to which the UE was attached, where the context of the UE is sent, by the source MME to which the UE was attached, in the handover process according to an acquired indicator for transferring the context of the UE, and the UE is a UE served by the RN when the S1 handover occurs.

202: The target MME to which the UE is attached acquires security information of the UE according to the received context of the UE.

The indicator for transferring the context of the UE is specifically a group mobility indicator or an indicator to get UE context.

When the source MME to which the UE was attached is different from a source MME to which the RN was attached and the indicator for transferring the context of the UE is specifically the indicator to get UE context, before the target MME to which the UE is attached receives, in the handover process, the context of the UE that is sent by the source MME to which the UE was attached, the method further includes:

receiving a TAU request sent by the UE; and sending, according to the TAU request, the indicator to get UE context to the source MME to which the UE was attached, so that the source MME to which the UE was attached uses the indicator to get UE context as the indicator for transferring the context of the UE.

Optionally, when the source MME to which the UE was attached is different from the source MME to which the RN was attached and the indicator for transferring the context of the UE is specifically the indicator to get UE context, before the target MME to which the UE is attached receives, in the handover process, the context of the UE that is transferred by the source MME to which the UE was attached, the method further includes:

receiving a group mobility indicator sent by a target MME to which the RN is attached, where the group mobility indicator at least includes identifiers of UEs served by the RN; and sending, according to the group mobility indicator, the indicator to get UE context to the source MME to which the UE was attached, so that the source MME to which the UE was attached uses the indicator to get UE context as the indicator for transferring the context of the UE.

Figure 3:
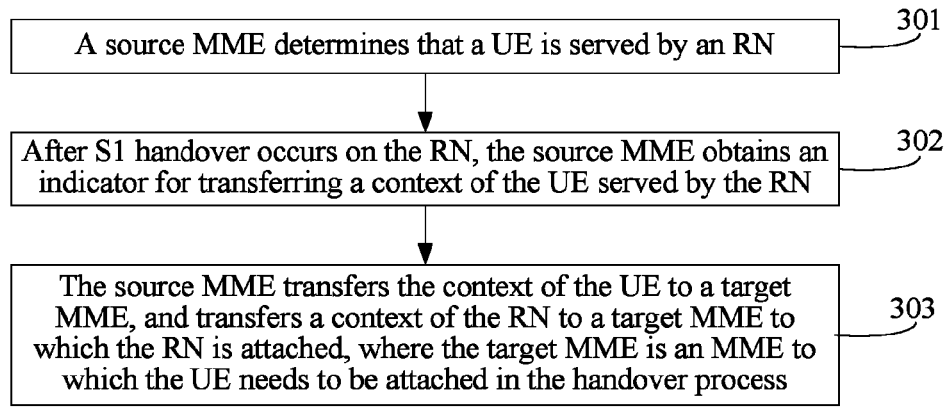
FIG. 3 is a flowchart of a method for transferring a context according to another embodiment of the present invention.

To describe the method provided in this embodiment of the present invention with more details, next the following embodiments are used as examples to explain the method provided in this embodiment of the present invention. For details, refer to content of the following embodiments:

Another embodiment of the present invention provides a method for transferring a context. The method uses an example that a source MME to which a UE is attached is the same as a source MME to which an RN is attached, so as to explain in detail the method provided in the foregoing embodiment. For ease of description, a same MME to which the UE and the RN are attached before S1 handover occurs on the RN is simply called a source MME. Referring to FIG. 3, a process of the method provided in this embodiment is as follows:

301: The source MME determines that the UE is served by the RN.

In this embodiment, a manner in which the source MME determines that the UE is served by the RN is not limited, and includes but is not limited to the following manners:

First manner: When the UE accesses a network, the source MME receives an attach request message (attach request message) that is sent by the UE and carries an RN indicator, and determines, according to the RN indicator carried in the attach request message, that the UE is served by the RN; or when the UE accesses a network, the source MME receives an S1 initial UE message (S1 initial UE message) that is directly sent by the RN or sent by a DeNB and carries an RN indicator, and determines, according to the RN indicator carried in the S1 initial UE message, that the UE is served by the RN; where the RN indicator is an RN cell identifier, an RN eNB identifier, or an identifier indicating an RN node type.

For this manner, for network access of the UE, that is, in a process in which the UE completes initial network access through the RN, the RN (corresponding to an Alt 1 Relay architecture) and/or the DeNB (corresponding to an R-10 Relay architecture, that is, Alt 2) selects the same source MME as that of the RN for the UE, and an S1 message is used to instruct the source MME to bind the UE to the RN. A specific method is that the RN adds an indicator (indicator) in an S1 Initial UE context message to indicate that the UE is a UE accessing the network from a mobile RN. After the Initial UE context message that carries the indicator is sent by the DeNB to the source MME or directly sent by the RN to the source MME, the source MME can identify, through this IE (information element), that the UE is served by the RN, and binds the UE to the RN (that is, adds the UE to a UE group served by the RN); or, an RN indicator is added to UE network access signaling, where the indicator may be an RN cell identifier, or an identifier such as an RN eNB ID, and this is not specifically limited in this embodiment. Optionally, this indicator may also be added in an attach request (attach request) message of the UE. A target cell identifier may be an ECGI (E-UTRAN cell global identifier, E-UTRAN cell global identifier), and a specific target cell identifier is not limited in this embodiment.

Second manner: When the RN performs the S1 handover, the source MME receives an identifier list of UEs served by the RN, where the identifier list is sent by a DeNB; and determines, according to the identifier list of the UEs, that the UE is served by the RN.

For this manner, when the DeNB determines that the RN needs to perform the S1 handover, the DeNB sends a handover required (handover required) message to the source MME, where the handover required message carries the identifier list of the UEs served by the RN. In addition, another sending manner may also be selected, and a manner in which the DeNB sends the identifier list of the UEs served by the RN is not limited in this embodiment.

Third manner: When the UE is handed over to the RN through S1, the source MME receives a relocation request message sent by an MME to which the UE was attached before the UE is handed over to the RN through S1, where the relocation request message carries an indicator for handing over the UE to the RN; and the source MME determines, according to the indicator for handing over the UE to the RN that is carried in the relocation request message, that the UE is served by the RN; or when the UE is handed over to the RN through X2, the source MME receives a path switch request message (Path Switch Request message) sent by the RN, where the path switch request message carries an indicator for handing over the UE to the RN; determines, according to the indicator for handing over the UE to the RN that is carried in the path switch request message, that the UE is served by the RN.

The indicator for handing over the UE to the RN may be an RN cell identifier, an RN eNB identifier, or an identifier indicating an RN node type. The RN cell identifier may be a target cell identifier. For example, if the relocation request message carries a target cell identifier ECGI of the RN to which the UE will hand over, the source MME determines, according to the ECGI carried in the relocation request message, that a target node is the RN, and further determines that the UE is served by the RN. In addition, the indicator may be an explicit separate identifier, or may be implicit, that is, another identifier that can represent an identity of the UE under the RN is used for indication.

This embodiment does not specifically limit which one of the foregoing manners will be used by the source MME for determining that the UE is served by the RN.

302: After the S1 handover occurs on the RN, the source MME obtains an indicator for transferring a context of the UE served by the RN.

In this step, because the source MME to which the UE is attached is the same as the source MME to which the RN is attached, after the source MME determines that the UE is served by the RN, the source MME can be aware, when the RN performs the S1 handover, that the UE moves along with the RN. Therefore, after the S1 handover occurs on the RN, the source MME can know that the context of the UE served by the RN needs to be transferred, and this means that the source MME obtains the indicator for transferring the context of the UE.

303: The source MME transfers the context of the UE to a target MME, and transfers a context of the RN to a target MME to which the RN is attached, where the target MME is an MME to which the UE needs to be attached in the handover process.

In the method provided in this embodiment, for a case in which a UE and an RN are attached to a same MME, a source MME determines that the UE is served by the RN; and after the RN completes S1 handover, the source MME acquires an indicator for transferring a context of the UE served by the RN, transfers the context of the UE to a target MME to which the UE is attached, and at the same time transfers a context of the RN to a target MME to which the RN is attached. In this way, not only transfer of the context of the RN is implemented, but transfer of the context of the UE is also implemented when the S1 handover occurs on the RN, so that the target MME to which the UE is attached can acquire security information of the UE, thereby ensuring continuity of communication between the UE and the target MME of the UE, and implementing security protection for an NAS message between the UE and the target MME of the UE.

Figure 4:
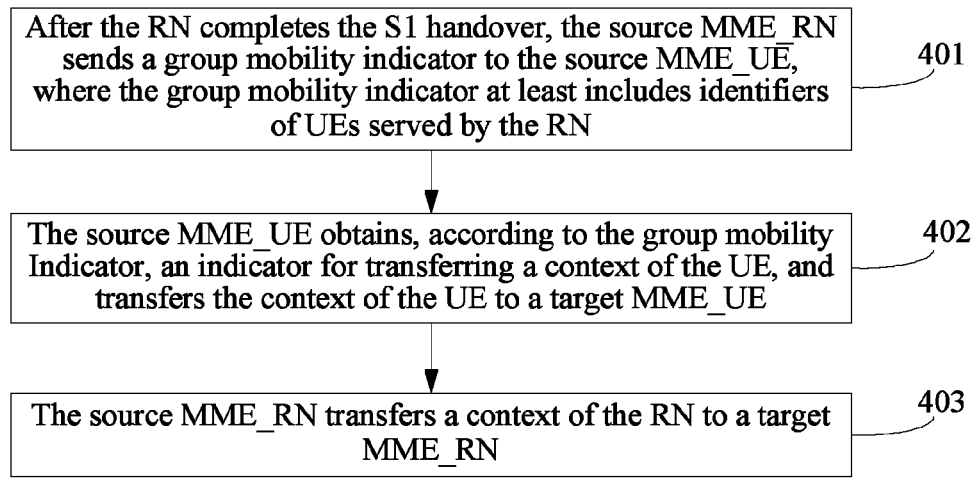
FIG. 4 is a flowchart of a method for transferring a context according to another embodiment of the present invention.

Another embodiment of the present invention provides a method for transferring a context. The method uses an example that a source MME to which a UE is attached is different from a source MME to which an RN is attached, so as to explain in detail the method provided in the foregoing embodiment. For ease of description, in this embodiment, an MME to which the UE is attached before S1 handover occurs on the RN is simply called a source MME_UE, an MME to which the RN is attached before the S1 handover occurs on the RN is simply called a source MME_RN, an MME to which the UE is attached after the S1 handover occurs on the RN is simply called a target MME_UE, and an MME to which the RN is attached after the S1 handover occurs on the RN is simply called a target MME_RN. Referring to FIG. 4, a process of the method provided in this embodiment is specifically as follows:

401: After the RN completes the S1 handover, the source MME_RN sends a group mobility indicator to the source MME_UE, where the group mobility indicator at least includes identifiers of UEs served by the RN.

In this embodiment, specific content of the group mobility indicator (group mobility indicator) sent by the source MME_RN is not limited. In the method provided in this embodiment, in order to enable the source MME_UE to transfer a context of the UE to the target MME_UE, the group mobility indicator sent by the source MME_RN to the source MME_UE at least includes the identifiers of the UEs served by the RN.

402: The source MME_UE obtains, according to the group mobility indicator, an indicator for transferring the context of the UE, and transfers the context of the UE to the target MME_UE.

In this step, the source MME_UE determines, according to the identifiers of the UEs served by the RN that are included in the group mobility indicator, that the UE is moving. That is, the source MME_UE obtains the indicator for transferring the context of the UE, and sends the context of the UE to the target MME_UE, thereby ensuring continuity of communication between the UE and the target MME_UE.

403: The source MME_RN transfers a context of the RN to the target MME_RN.

It should be noted that the step 403 may also be executed before the step 402 or the step 401, and this is not specifically limited in this embodiment, as long as the source MME_RN transfers the context of the RN to the target MME_RN after the RN completes the S1 handover.

In the method provided in this embodiment, for a case in which a UE and an RN are attached to different MMEs, a source MME_RN sends a group mobility indicator to a source MME_UE to instruct the source MME_UE to send a context of the UE to a target MME_UE, so that after the RN completes S1 handover, the source MME_UE transfers the context of the UE to the target MME_UE and the source MME_RN transfers a context of the RN to a target MME_RN. In this way, not only transfer of the context of the RN is implemented, but transfer of the context of the UE is also implemented when the S1 handover occurs on the RN, so that the target MME to which the UE is attached can acquire security information of the UE, thereby ensuring continuity of communication between the UE and the target MME of the UE, and implementing security protection for an NAS message between the UE and the target MME of the UE.

Figure 5:
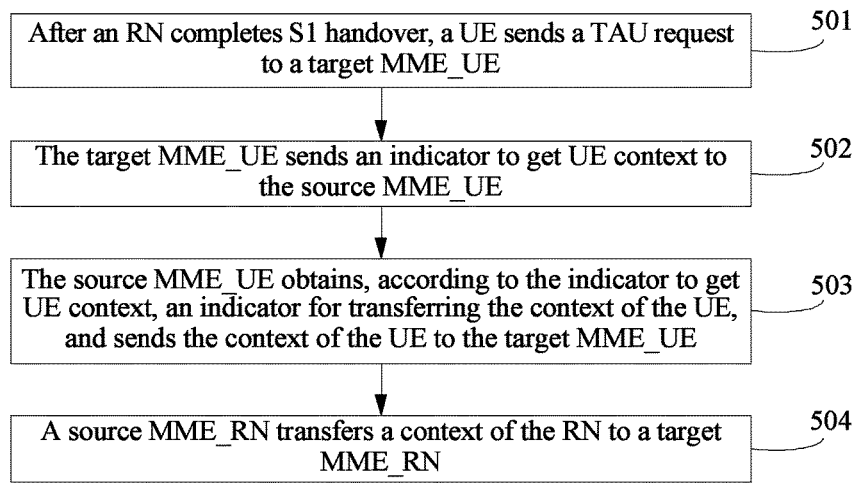
FIG. 5 is a flowchart of a method for transferring a context according to another embodiment of the present invention.

Another embodiment of the present invention provides a method for transferring a context. The method uses an example that a source MME to which a UE is attached is different from a source MME to which an RN is attached, so as to explain in detail the method provided in the foregoing embodiment. For ease of description, in this embodiment, an MME to which the UE is attached before S1 handover occurs on the RN is simply called a source MME_UE, an MME to which the RN is attached before the S1 handover occurs on the RN is simply called a source MME_RN, an MME to which the UE is attached after the S1 handover occurs on the RN is simply called a target MME_UE, and an MME to which the RN is attached after the S1 handover occurs on the RN is simply called a target MME_RN. Referring to FIG. 5, a process of the method provided in this embodiment is specifically as follows:

501: After the RN completes the S1 handover, the UE sends a TAU request to the target MME_UE.

Specifically, in this embodiment, content of the TAU request sent by the UE is not limited, and at least includes information such as a GUTI or an S-TMSI. A specific TAU initiation process is the same as an existing TAU process, and this is not specifically limited in this embodiment.

502: The target MME_UE sends an indicator to get UE context to the source MME_UE.

In this embodiment, specific content of the indicator to get UE context (indicator to get UE context) that is sent by the source MME_UE is not limited. In the method provided in this embodiment, in order to enable the source MME_UE to determine which UE managed by the source MME_UE corresponds to the context to be transferred, the indicator to get UE context that is sent by the target MME_UE to the source MME_UE at least includes an identifier of the UE.

503: The source MME_UE obtains, according to the indicator to get UE context, an indicator for transferring the context of the UE, and sends the context of the UE to the target MME_UE.

In this step, the source MME_UE can obtain, according to the indicator to get UE context, the indicator for transferring the context of the UE, and sends the context of the UE to the target MME_UE, thereby ensuring continuity of communication between the UE and the target MME_UE.

504: The source MME_RN transfers a context of the RN to the target MME_RN.

It should be noted that the step 504 may also be executed before the step 503, the step 502, or the step 501, and this is not specifically limited in this embodiment, as long as the source MME_RN transfers the context of the RN to the target MME_RN after the RN completes the S1 handover.

In the method provided in this embodiment, for a case in which a UE and an RN are attached to different MMEs, the UE initiates a TAU process, and a target MME_UE requests a context of the UE from a source MME_UE, so that after the RN completes S1 handover, the source MME_UE transfers the context of the UE to the target MME_UE and a source MME_RN transfers a context of the RN to a target MME_RN. In this way, not only transfer of the context of the RN is implemented, but transfer of the context of the UE is also implemented when the S1 handover occurs on the RN, so that the target MME to which the UE is attached can acquire security information of the UE, thereby ensuring continuity of communication between the UE and the target MME of the UE, and implementing security protection for an NAS message between the UE and the target MME of the UE.

Figure 6:
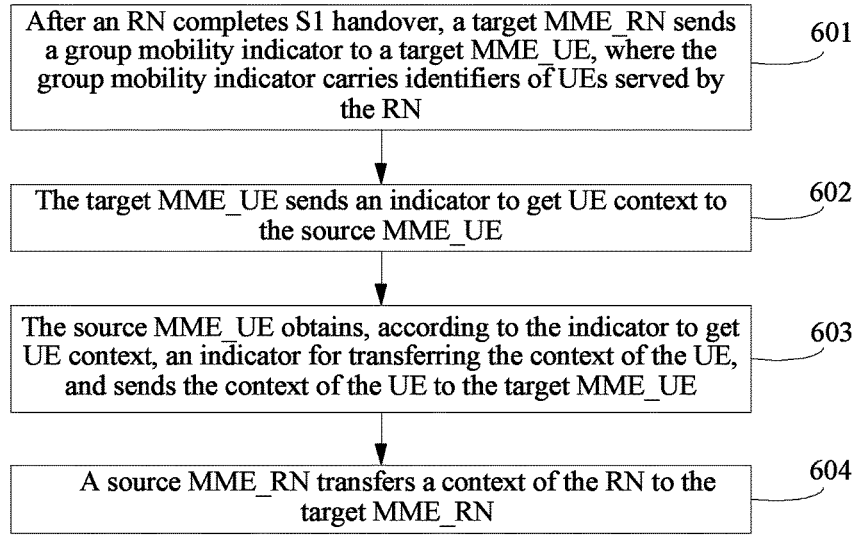
FIG. 6 is a flowchart of a method for transferring a context according to another embodiment of the present invention.

Another embodiment of the present invention provides a method for transferring a context. The method uses an example that a source MME to which a UE is attached is different from a source MME to which an RN is attached, so as to explain in detail the method provided in the foregoing embodiment. For ease of description, in this embodiment, an MME to which the UE is attached before S1 handover occurs on the RN is simply called a source MME_UE, an MME to which the RN is attached before the S1 handover occurs on the RN is simply called a source MME_RN, an MME to which the UE is attached after the S1 handover occurs on the RN is simply called a target MME_UE, and an MME to which the RN is attached after the S1 handover occurs on the RN is simply called a target MME_RN. Referring to FIG. 6, a process of the method provided in this embodiment is specifically as follows:

601: After the RN completes the S1 handover, the target MME_RN sends a group mobility indicator to the target MME_UE, where the group mobility indicator carries identifiers of UEs served by the RN.

In this embodiment, specific content of the group mobility indicator (group mobility indicator) sent by the target MME_RN is not limited. In the method provided in this embodiment, in order to enable the target MME_UE to request a corresponding context of the UE from the source MME_UE, the group mobility indicator sent by the target MME_RN to the target MME_UE at least includes the identifiers of the UEs served by the RN.

602: The target MME_UE sends an indicator to get UE context to the source MME_UE.

In this step, specific content of the indicator to get UE context that is sent by the target MME_UE is not limited in this embodiment. In the method provided in this embodiment, in order to enable the source MME_UE to determine which UE managed by the source MME_UE corresponds to the context to be transferred, the indicator to get UE context that is sent by the target MME_UE to the source MME_UE at least includes an identifier of the UE.

603: The source MME_UE obtains, according to the indicator to get UE context, an indicator for transferring the context of the UE, and sends the context of the UE to the target MME_UE.

In this step, the source MME_UE can obtain, according to the indicator to get UE context, the indicator for transferring the context of the UE, and sends the context of the UE to the target MME_UE, thereby ensuring continuity of communication between the UE and the target MME_UE.

604: The source MME_RN transfers a context of the RN to the target MME_RN.

It should be noted that the step 604 may also be executed before the step 603, the step 602, or the step 601, and this is not specifically limited in this embodiment, as long as the source MME_RN transfers the context of the RN to the target MME_RN after the RN completes the S1 handover.

In the method provided in this embodiment, for a case in which a UE and an RN are attached to different MMEs, a target MME_RN sends a group mobility indicator to a target MME_UE to instruct the target MME_UE to request a context of the UE from a source MME_UE, so that after the RN completes S1 handover, the source MME_UE transfers the context of the UE to the target MME_UE and the source MME_RN transfers a context of the RN to a target MME_RN. In this way, not only transfer of the context of the RN is implemented, but transfer of the context of the UE is also implemented when the S1 handover occurs on the RN, so that the target MME to which the UE is attached can acquire security information of the UE, thereby ensuring continuity of communication between the UE and the target MME of the UE, and implementing security protection for an NAS message between the UE and the target MME of the UE.

Figure 7:
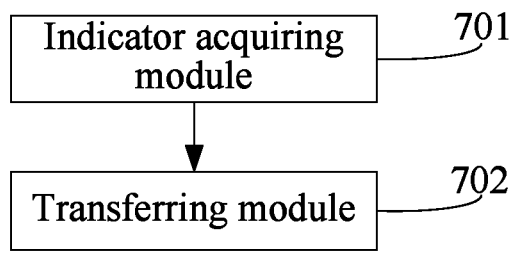
FIG. 7 is a schematic structural diagram of a mobility management entity according to another embodiment of the present invention.

Another embodiment of the present invention provides a mobility management entity MME. Referring to FIG. 7, the MME includes:

an indicator acquiring module 701, configured to acquire an indicator for transferring a context of a UE, where the UE is a UE served by an RN when S1 handover occurs on the RN; and a transferring module 702, configured to transfer, according to the indicator for transferring the context of the UE that is acquired by the indicator acquiring module 701, the context of the UE to a target MME, so that the target MME acquires security information of the UE according to the context of the UE, where the target MME is an MME to which the UE needs to be attached in the handover process.

Figure 8:
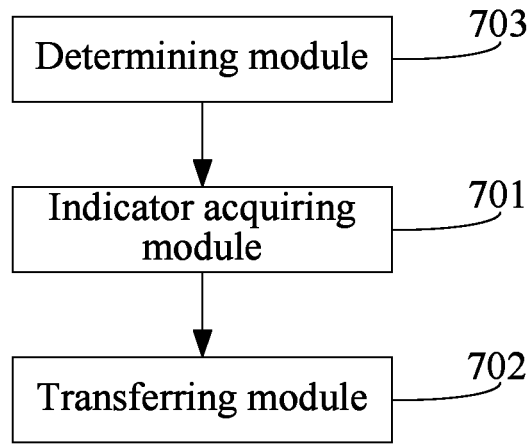
FIG. 8 is a schematic structural diagram of a mobility management entity according to another embodiment of the present invention.

Referring to FIG. 8, the MME further includes:

a determining module 703, configured to: when a source MME to which the UE is attached is the same as a source MME to which the RN is attached, determine that the UE is served by the RN; and correspondingly, the indicator acquiring module 701 is specifically configured to acquire the indicator for transferring the context of the UE that is determined by the determining module 703.

Further, the determining module 702 is specifically configured to: when the UE accesses a network, receive an attach request message that is sent by the UE and carries an RN indicator; and determine, according to the RN indicator carried in the attach request message, that the UE is served by the RN, where the RN indicator is an RN cell identifier, an RN eNB identifier, or an identifier indicating an RN node type;

or the determining module 702 is specifically configured to: when the UE accesses a network, receive an S1 initial UE message that is directly sent by the RN or sent by a DeNB and carries an RN indicator; and determine, according to the RN indicator carried in the S1 initial UE message, that the UE is served by the RN, where the RN indicator is an RN cell identifier, an RN eNB identifier, or an identifier indicating an RN node type;

or the determining module 702 is specifically configured to: when the RN performs the S1 handover, receive an identifier list of UEs served by the RN, where the identifier list is sent by a DeNB; and determine, according to the identifier list of the UEs, that the UE is served by the RN;

or the determining module 702 is specifically configured to: when the UE is handed over to the RN through S1, receive a relocation request message sent by an MME to which the UE was attached before the UE is handed over to the RN through S1, where the relocation request message carries an indicator for handing over the UE to the RN; and determine, according to the indicator for handing over the UE to the RN that is carried in the relocation request message, that the UE is served by the RN;

or the determining module 702 is specifically configured to: when the UE is handed over to the RN through X2, receive a path switch request message sent by the RN, where the path switch request message carries an indicator for handing over the UE to the RN; and determine, according to the indicator for handing over the UE to the RN that is carried in the path switch request message, that the UE is served by the RN.

The indicator acquiring module 701 is specifically configured to acquire a group mobility indicator or an indicator to get UE context.

Figure 9:
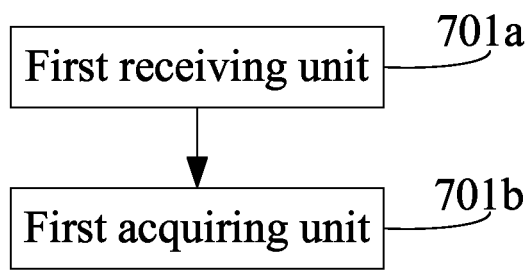
FIG. 9 is a schematic structural diagram of an indicator acquiring module according to another embodiment of the present invention.

Referring to FIG. 9, the indicator acquiring module 701 specifically includes:

a first receiving unit 701a, configured to receive, when a source MME to which the UE is attached is different from a source MME to which the RN is attached and the indicator for transferring the context of the UE is specifically the group mobility indicator, the group mobility indicator sent by a source MME to which the RN is attached, where the group mobility indicator at least includes identifiers of UEs served by the RN; and a first acquiring unit 701b, configured to use the group mobility indicator that is received by the first receiving unit 701 a as the acquired indicator for transferring the context of the UE.

Figure 10:
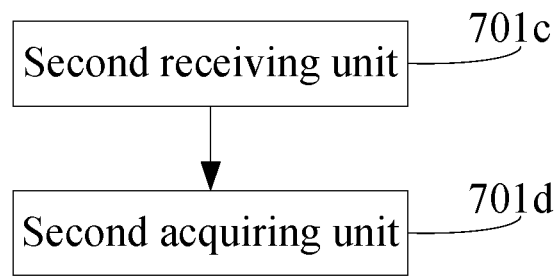
FIG. 10 is a schematic structural diagram of an indicator acquiring module according to another embodiment of the present invention.

Optionally, referring to FIG. 10, the indicator acquiring module 701 specifically includes:

a second receiving unit 701c, configured to receive, when the source MME to which the UE is attached is different from the source MME to which the RN is attached and the indicator for transferring the context of the UE is specifically the indicator to get UE context, the indicator to get UE context after the RN completes the S1 handover, where the indicator to get UE context is sent by the target MME to which the UE is attached; and a second acquiring unit 701d, configured to use the indicator to get UE context that is received by the second receiving unit 701c as the acquired indicator for transferring the context of the UE; where:

the indicator to get UE context that is received by the second receiving unit 701c is sent after the target MME to which the UE is attached receives a TAU request, where the TAU request is sent by the UE; or sent after receipt of a group mobility indicator, where the group mobility indicator is sent by a target MME to which the RN is attached, and the group mobility indicator at least includes the identifiers of the UEs served by the RN.

The mobility management entity provided in this embodiment transfers, after an RN completes S1 handover, a context of a UE to a target MME to which the UE will be attached, thereby implementing transfer of the context of the UE when S1 handover occurs on the RN. In this way, the target MME to which the UE will be attached can acquire security information of the UE, thereby ensuring continuity of communication between the UE and the target MME of the UE, and implementing security protection for an NAS message between the UE and the target MME of the UE.

Figure 11:
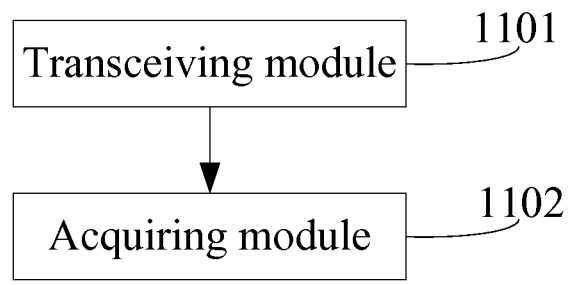
FIG. 11 is a schematic structural diagram of a mobility management entity according to another embodiment of the present invention.

Another embodiment of the present invention further provides a mobility management entity MME. Referring to FIG. 11, the MME includes:

a transceiving module 1101, configured to receive a context of a UE that is sent by a source MME to which the UE is attached, where the context of the UE is sent, by the source MME to which the UE is attached, in a process of S1 handover that occurs on an RN and according to an acquired indicator for transferring the context of the UE, and the UE is a UE served by the RN when the S1 handover occurs; and an acquiring module 1102, configured to acquire security information of the UE according to the context of the UE, where the context of the UE is received by the transceiving module 1101.

Further, the transceiving module 1101 is further configured to receive, when the source MME to which the UE is attached is different from a source MME to which the RN is attached and the indicator for transferring the context of the UE is an indicator to get UE context, a TAU request sent by the UE; and send, according to the TAU request, the indicator to get UE context to the source MME to which the UE is attached, so that the source MME to which the UE is attached uses the indicator to get UE context as the indicator for transferring the context of the UE.

Optionally, the transceiving module 1101 is further configured to receive, when the source MME to which the UE is attached is different from the source MME to which the RN is attached and the indicator for transferring the context of the UE is specifically the indicator to get UE context, a group mobility indicator sent by a target MME to which the RN is attached, where the group mobility indicator at least includes identifiers of UEs served by the RN; and send, according to the group mobility indicator, the indicator to get UE context to the source MME to which the UE is attached, so that the source MME to which the UE is attached uses the indicator to get UE context as the indicator for transferring the context of the UE.

The mobility management entity provided in this embodiment receives a context of a UE that is sent by a source MME to which the UE is attached, and acquires security information of the UE according to the context of the UE, thereby ensuring continuity of communication between the UE and a target MME of the UE, and implementing security protection for an NAS message between the UE and the target MME of the UE.

It should be noted that when the mobility management entity provided in the foregoing embodiment transfers a context, division of the foregoing function modules is merely exemplary; and in actual application, the foregoing functions can be allocated to different modules and implemented as necessary, that is, an inner structure of the entity is divided into different function modules to implement all or a part of the functions described above. In addition, the mobility management entity provided in the foregoing embodiment and the embodiments of the methods for transferring a context belong to a same thought. For a specific implementation process, refer to the method embodiments, and no further details are provided herein.

Serial numbers of the foregoing embodiments of the present invention are merely used for description, but do not indicate preference of the embodiments.

All or a part of the steps of the embodiments of the present invention may be implemented through hardware, or may be implemented by a program instructing relevant hardware. The program may be stored in a readable storage medium, such as an optical disc or a hard disk.

The foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A method for transferring a context, wherein when S1 handover occurs on a relay node (RN) the method comprises:

acquiring, by a source mobility management entity (MME) to which a user equipment (UE) is attached through the RN, an indicator for transferring a context of the UE, wherein the UE is served by the RN when the S1 handover occurs on the RN; and transferring, by the source MME to which the UE is attached, the context of the UE to a target MME according to the indicator for transferring the context of the UE, so that the target MME acquires security information of the UE according to the context of the UE so as to implement security protection for a Non-access Stratum (NAS) message for the UE, wherein the target MME is an MME to which the UE needs to be attached in the S1 handover, wherein when the source MME to which the UE is attached is the same as the source MME to which the RN is attached, the method further comprises determining that the UE is served by the RN, and wherein the determining that the UE is served by the RN comprises when the UE accesses a network, receiving, by the source MME to which the UE is attached, an attach request message that is sent by the UE and carries an RN indicator; and determining, according to the RN indicator carried in the attach request message, that the UE is served by the RN, wherein the RN indicator is an RN cell identifier, an RN eNB identifier, or an identifier indicating an RN node type.

2. The method according to claim 1, wherein the indicator for transferring the context of the UE comprises a group mobility indicator or another indicator to get UE context.

3. The method according to claim 1, wherein when the source MME to which the UE is attached is different from another source MME to which the RN is attached and the indicator for transferring the context of the UE is the group mobility indicator, the acquiring, by the source MME to which the UE is attached, the indicator for transferring a context of the UE comprises:

receiving, by the source MME to which the UE is attached, the group mobility indicator sent by the source MME to which the RN is attached, wherein the group mobility indicator at least comprises identifiers of UEs served by the RN.

4. The method according to claim 1, wherein when the source MME to which the UE is attached is different from the source MME to which the RN is attached and the indicator for transferring the context of the UE is the indicator to get UE context, the acquiring further comprises:

after the RN finishes the S1 handover, receiving, by the source MME to which the UE is attached, the indicator to get UE context, wherein the indicator is sent by the target MME to which the UE is attached, wherein the indicator to get UE context is sent in the S1 handover after the target MME to which the UE is attached receives a tracking area update (TAU) request, wherein the TAU request is sent by the the UE or sent after receipt of a group mobility indicator, and wherein the group mobility indicator is sent by the target MME to which the RN is attached, and the group mobility indicator at least comprises identifiers of UEs served by the RN.

5. A mobility management entity (MME), comprising:

a processor, configured to acquire an indicator for transferring a context of a user equipment (UE), wherein the UE is served by a relay node (RN) when S1 handover occurs on the RN, wherein the RN is attached to the MME, and wherein the UE is attached to the MME through the RN; and a transmitter, configured to transfer, according to the indicator for transferring the context of the UE that is acquired by the processor, the context of the UE to a target MME, so that the target MME acquires security information of the UE according to the context of the UE so as to implement security protection for a Non-access Stratum (NAS) message for the UE, wherein the target MME is an MME to which the UE needs to be attached in the S1 handover, wherein the processor is configured to:

determine that the UE is served by the RN when a source MME to which the UE is attached is the same as the source MME to which the RN is attached;

acquire the indicator for transferring the context of the UE served by the RN, wherein the indicator for transferring the context of the UE is determined; and when the UE accesses a network, receive an attach request message that is sent by the UE and carries an RN indicator; and determine, according to the RN indicator carried in the attach request message, that the UE is served by the RN, wherein the RN indicator is an RN cell identifier, an RN eNB identifier, or an identifier indicating an RN node type.

6. The mobility management entity according to claim 5, wherein the processor is configured to acquire a group mobility indicator or another indicator to get UE context.

7. The mobility management entity according to claim 5, wherein the processor is configured to:

receive the group mobility indicator sent by the source MME to which the RN is attached when the target MME is different from the source MME to which the RN is attached and the indicator for transferring the context of the UE is the group mobility indicator, wherein the group mobility indicator at least comprises identifiers of UEs served by the RN; and use the group mobility indicator as the acquired indicator for transferring the context of the UE.

8. The mobility management entity according to claim 5, wherein the processor configured to:

receive, when a source MME to which the UE is attached is different from the source MME to which the RN is attached and the indicator for transferring the context of the UE is specifically the indicator to get UE context, the indicator to get UE context after the RN completes the S1 handover, wherein the indicator to get UE context is sent by the target MME to which the UE is attached; and use the indicator to get UE context that is received by the second receiving unit as the acquired indicator for transferring the context of the UE; wherein:

the indicator to get UE context that is received is sent after the target MME to which the UE is attached receives a tracking area update TAU request, wherein the TAU request is sent by the UE; or sent after receipt of a group mobility indicator, wherein the group mobility indicator is sent by a target MME to which the RN is attached, and the group mobility indicator at least comprises the identifiers of the UEs served by the RN.

9. A method for transferring a context, wherein when S1 handover occurs on a relay node (RN), the method comprises:

determining that a user equipment (UE) is served by the RN which comprises when the UE accesses a network, receiving, by the source MME to which the UE is attached, an attach request message that is sent by the UE and carries an RN indicator; and determining, according to the RN indicator carried in the attach request message, that the UE is served by the RN, wherein the RN indicator is an RN cell identifier, an RN eNB identifier, or an identifier indicating an RN node type;

receiving, by a target MME to which the UE is attached through the RN, a context of the UE that is sent by a the source MME to which the UE was attached so as to implement security protection for a Non-access Stratum (NAS) message for the UE, wherein the context of the UE is sent, by the source MME to which the UE was attached through the RN, during the S1 handover according to an acquired indicator for transferring the context of the UE, and the UE is served by the RN when the S1 handover occurs on the RN; and acquiring, by the target MME to which the UE is attached, security information of the UE according to the received context of the UE.

10. The method according to claim 9, wherein the indicator for transferring the context of the UE comprises a group mobility indicator or another indicator to get UE context.

11. The method according to claim 9, wherein when the source MME to which the UE is attached is different from the source MME to which the RN is attached and the indicator for transferring the context of the UE is the indicator to get UE context, before the receiving, by the target MME to which the UE is attached, the context of the UE that is sent by the source MME to which the UE was attached, the method further comprises:

receiving a tracking area update TAU request sent by the UE; and sending, according to the TAU request, the indicator to get UE context to the source MME to which the UE was attached, so that the source MME to which the UE was attached uses the indicator to get UE context as the indicator for transferring the context of the UE.

12. The method according to claim 9, wherein when the source MME to which the UE is attached is different from the source MME to which the RN is attached and the indicator for transferring the context of the UE is the indicator to get UE context, before the receiving, by the target MME to which the UE is attached, the context of the UE that is sent by the source MME to which the UE was attached, the method further comprises:

receiving a group mobility indicator sent by the target MME to which the RN is attached, wherein the group mobility indicator at least comprises identifiers of UEs served by the RN; and sending, according to the group mobility indicator, the indicator to get UE context to the source MME to which the UE was attached, so that the source MME to which the UE was attached uses the indicator to get UE context as the indicator for transferring the context of the UE.

13. A mobility management entity (MME), comprising:

a receiver, configured to receive a context of a user equipment (UE) that is sent by a source MME to which the UE is attached, wherein the context of the UE is sent, by the source MME to which the UE is attached through a relay node (RN), in a process of S1 handover that occurs on the RN and according to an acquired indicator for transferring the context of the UE, and wherein the UE is served by the RN when the S1 handover occurs on the RN, the transferring of the context UE thereby implementing security protection for a Non-access Stratum (NAS) message for the UE; and a processor, configured to acquire security information of the UE according to the context of the UE, wherein the context of the UE is received by the receiver, wherein the processor is configured to:

determine that the UE is served by the RN which comprises when the source MME to which the UE is attached is the same as the source MME to which the RN is attached and when the UE accesses a network, receive an attach request message that is sent by the UE and carries an RN indicator, and determine, according to the RN indicator carried in the attach request message, that the UE is served by the RN, wherein the RN indicator is an RN cell identifier, an RN eNB identifier, or an identifier indicating an RN node type.

14. The mobility management entity according to claim 13, wherein:

the receiver is further configured to receive, when the source MME to which the UE is attached is different from a source MME to which the RN is attached and the indicator for transferring the context of the UE is an indicator to get UE context, a tracking area update TAU request sent by the UE; and the receiver is configured to send, according to the TAU request, the indicator to get UE context to the source MME to which the UE is attached, so that the source MME to which the UE is attached uses the indicator to get UE context as the indicator for transferring the context of the UE.

15. The mobility management entity according to claim 13, wherein:

the receiver is further configured to receive, when the source MME to which the UE is attached is different from a source MME to which the RN is attached and the indicator for transferring the context of the UE is an indicator to get UE context, a group mobility indicator sent by a target MME to which the RN is attached, wherein the group mobility indicator at least comprises identifiers of UEs served by the RN; and the receiver is further configured to send, according to the group mobility indicator, the indicator to get UE context to the source MME to which the UE is attached, so that the source MME to which the UE is attached uses the indicator to get UE context as the indicator for transferring the context of the UE.

* * * * *